United States Patent
Hui et al.

(10) Patent No.: US 9,634,982 B2
(45) Date of Patent: Apr. 25, 2017

(54) UTILIZING MULTIPLE INTERFACES WHEN SENDING DATA AND ACKNOWLEDGEMENT PACKETS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 847 days.

(21) Appl. No.: 13/945,886

(22) Filed: Jul. 18, 2013

(65) Prior Publication Data

US 2015/0026268 A1    Jan. 22, 2015

(51) Int. Cl.
*H04L 12/58*    (2006.01)

(52) U.S. Cl.
CPC .................................. *H04L 51/38* (2013.01)

(58) Field of Classification Search
CPC ......... H04L 51/38; H04L 51/18; H04L 51/30; H04L 51/34; H04L 51/046; H04L 51/26; H04L 51/36
USPC ......................................... 709/206, 207, 228
See application file for complete search history.

(56) References Cited

U.S. PATENT DOCUMENTS

| | | | | |
|---|---|---|---|---|
| 7,072,337 B1 * | 7/2006 | Arutyunov | .......... | H04L 12/2801 370/389 |
| 7,720,043 B2 * | 5/2010 | Meylan | .................. | H04L 1/1642 370/282 |
| 8,270,429 B2 * | 9/2012 | Chen | .................. | H04W 72/1236 370/447 |
| 8,289,988 B2 * | 10/2012 | Lu | ..................... | H04W 74/0866 370/252 |

(Continued)

FOREIGN PATENT DOCUMENTS

| | | | | | |
|---|---|---|---|---|---|
| FR | WO 2012064795 A2 * | 5/2012 | ....... | H04L 29/12254 |
| GB | 2495910 A * | 5/2013 | ........... | H04L 67/125 |

(Continued)

*Primary Examiner* — Kostas Katsikis

(74) *Attorney, Agent, or Firm* — Johnson, Marcou & Isaacs, LLC

(57) ABSTRACT

Utilizing multiple network interfaces when sending data and acknowledgement packages comprises, in a low power and lossy network (LLN) or other network, a sender device comprises two or more network interfaces for communicating with one or more recipient devices. The sender device assesses the transmission capabilities of the network interfaces to determine data rates available for each interface. The sender device specifies which network interface will be used to transfer data and which network interface will be used to receive an acknowledgement from the recipient device. The sender device selects the network interface with the larger data capacity for transmitting a data packet and the network interface with the smaller data capacity for receiving an acknowledgement. The data transmission and the acknowledgement transmission may be transmitted simul- (Continued)

taneously. The recipient device uses transmission parameters received from the sender device to determine the data rate with which to transmit the acknowledgement.

21 Claims, 8 Drawing Sheets

(56) References Cited

U.S. PATENT DOCUMENTS

| | | | | |
|---|---|---|---|---|
| 8,934,496 B2* | 1/2015 | Vasseur | | H04L 45/04 370/389 |
| 8,989,158 B2* | 3/2015 | Seok | | H04W 4/20 370/338 |
| 9,197,380 B2* | 11/2015 | Shetty | | H04L 1/1867 |
| 2004/0019571 A1* | 1/2004 | Hurwitz | | G06Q 20/06 705/65 |
| 2005/0177625 A1* | 8/2005 | Paek | | H04L 29/06 709/219 |
| 2006/0068780 A1* | 3/2006 | Dalsgaard | | H04W 48/10 455/432.3 |
| 2006/0223541 A1* | 10/2006 | Famolari | | H04W 72/02 455/450 |
| 2007/0249379 A1* | 10/2007 | Bantukul | | H04W 4/12 455/466 |
| 2007/0264936 A1* | 11/2007 | Kim | | H04L 5/023 455/45 |
| 2008/0263616 A1* | 10/2008 | Sallinen | | H04N 21/234327 725/131 |
| 2008/0298321 A1* | 12/2008 | Lee | | H04L 12/5692 370/331 |
| 2009/0319851 A1* | 12/2009 | Li | | H04L 1/1854 714/749 |
| 2010/0004015 A1* | 1/2010 | Nilsson | | H04W 52/58 455/522 |
| 2011/0286414 A1* | 11/2011 | Qu | | H04L 1/1854 370/329 |
| 2012/0106344 A1* | 5/2012 | Chrysos | | H04L 69/28 370/236 |
| 2012/0113986 A1* | 5/2012 | Shaffer | | H04L 1/1854 370/390 |
| 2012/0117208 A1* | 5/2012 | Shaffer | | H04L 29/12254 709/221 |
| 2012/0117268 A1* | 5/2012 | Shaffer | | H04L 45/24 709/238 |
| 2012/0117438 A1* | 5/2012 | Shaffer | | H04L 1/1825 714/749 |
| 2012/0155398 A1* | 6/2012 | Oyman | | H04L 47/26 370/329 |
| 2013/0031253 A1* | 1/2013 | Hui | | H04L 43/0811 709/225 |
| 2013/0121157 A1* | 5/2013 | Logvinov | | H04L 41/0833 370/238 |
| 2013/0322348 A1* | 12/2013 | Julian | | H04L 5/003 370/329 |
| 2013/0336196 A1* | 12/2013 | Abraham | | H04W 16/26 370/315 |
| 2014/0019496 A1* | 1/2014 | Chiu | | H04L 67/06 707/827 |

FOREIGN PATENT DOCUMENTS

| | | | | |
|---|---|---|---|---|
| JP | 2012105258 A | * | 5/2012 | |
| WO | WO 2012044995 A1 | * | 4/2012 | H04L 9/3066 |
| WO | WO 2012064794 A1 | * | 5/2012 | H04L 45/24 |

* cited by examiner

UTILIZING MULTIPLE INTERFACES WHEN SENDING DATA AND ACKNOWLEDGEMENT PACKETS

TECHNICAL FIELD

The present disclosure relates generally to computer networks and, more particularly, to utilizing multiple interfaces when sending data and acknowledgement packets.

BACKGROUND

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale internet protocol (IP) smart object networks pose a number of technical challenges. For instance, the degree of density of such networks (such as Smart Grid networks with a large number of sensors and actuators, smart cities, or advanced metering infrastructure (AMI) networks) may be extremely high. For example, it is not rare for each node to see several hundreds of neighbors. This architecture is particularly problematic for LLNs, where constrained links can wreak havoc on data transmission.

LLNs communicate over a physical medium that is strongly affected by environmental conditions that change over time. Some examples include temporal changes in interference (for example, other wireless networks or electrical appliances), physical obstruction (for example, doors opening/closing or seasonal changes in foliage density of trees), and propagation characteristics of the physical media (for example, temperature or humidity changes). The time scales of such temporal changes can range between milliseconds (for example, transmissions from other transceivers) to months (for example, seasonal changes of outdoor environment).

DESCRIPTION OF EXAMPLE EMBODIMENTS

Overview

Figure 1:
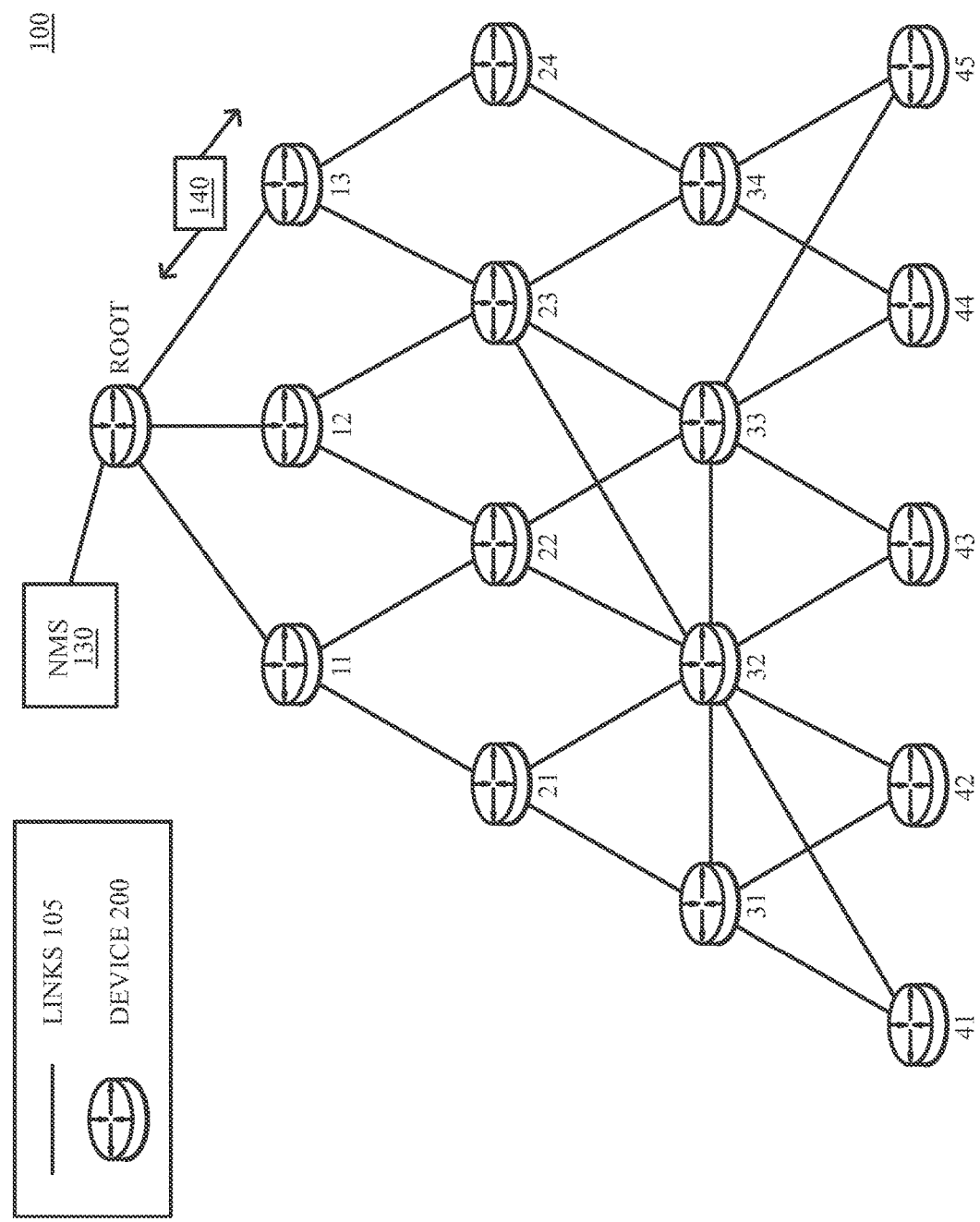
FIG. 1 is a diagram depicting an example communication network in accordance with certain example embodiments.

According to one or more embodiments of the disclosure, in a low power and lossy network (LLN) or other network, a sender device comprises two or more network interfaces for communicating with one or more recipient devices. The sender device assesses the transmission capabilities of the network interfaces to determine data rates available for each interface. The sender device specifies which network interface will be used to transfer data and which network interface will be used to receive an acknowledgement from the recipient device. The sender device selects the network interface with the larger data capacity for transmitting a data packet, and the network interface with the smaller data capacity for receiving an acknowledgement. The data transmission and the acknowledgement transmission may be transmitted simultaneously or independently. The recipient device uses transmission parameters received from the sender device to determine the data rate and interface with which to transmit the acknowledgement.

DESCRIPTION

Referring to the drawings, in which like numerals represent like (but not necessarily identical) elements throughout the figures, example embodiments are described.

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node)

in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of any range from a few dozen or up to thousands or even millions of LLN routers and support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network and that the view illustrated herein is for simplicity. Also, those skilled in the art will further understand that while the network is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using predefined network communication protocols, such as certain known wired protocols, wireless protocols (for example, IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
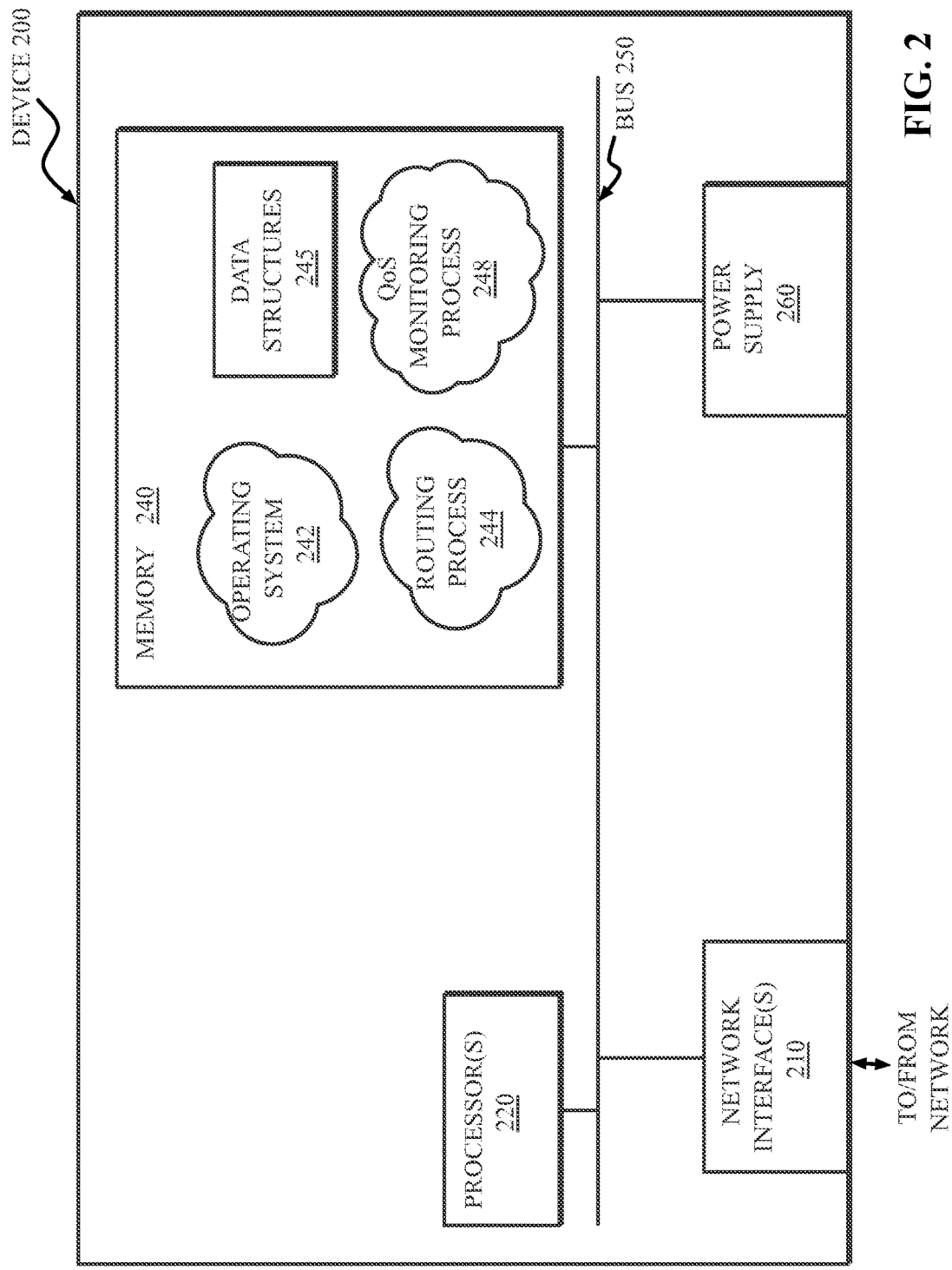
FIG. 2 is a block diagram depicting an example network device/node in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have multiple types of network connections 210, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:
 1) Links are generally lossy, such that a Packet Delivery Rate/Ratio (PDR) can dramatically vary due to various sources of interferences, for example, considerably affecting bit error rate (BER);
 2) Links are generally low bandwidth, such that control plane traffic must generally be bounded and negligible compared to the low rate data traffic;
 3) A number of use cases require specifying a set of link and node metrics, some of them being dynamic, thus requiring specific smoothing functions to avoid routing instability, which considerably drains bandwidth and energy;
 4) Constraint-routing may be required by some applications, for example, to establish routing paths that will avoid non-encrypted links, nodes running low on energy, etc.;
 5) Scale of the networks may become very large, for example, on the order of several thousands to millions of nodes; and
 6) Nodes may be constrained with low memory, a reduced processing capability, a low power supply (for example, battery), etc.

In other words, LLNs are a class of network in which both the routers and their interconnect are constrained: LLN routers typically operate with constraints, for example, processing power, memory, and/or energy (battery), and their interconnects are characterized by, illustratively, high loss rates, low data rates, and/or instability. LLNs are comprised of anything from a few dozen and up to thousands or even millions of LLN routers. Additionally, LLNs support point-to-point traffic (between devices inside the LLN), point-to-multipoint traffic (from a central control point to a subset of devices inside the LLN), and multipoint-to-point traffic (from devices inside the LLN towards a central control point).

An example implementation of LLNs is an "Internet of Things" network. As described above, the term "Internet of Things" or "IoT" may be used by those in the art to refer to uniquely identifiable objects (things) and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (for example, smart grid, smart cities, building and industrial automation, etc.), it has been of the utmost importance to extend the IP protocol suite for these networks.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example objective function (for example, a default objective function) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
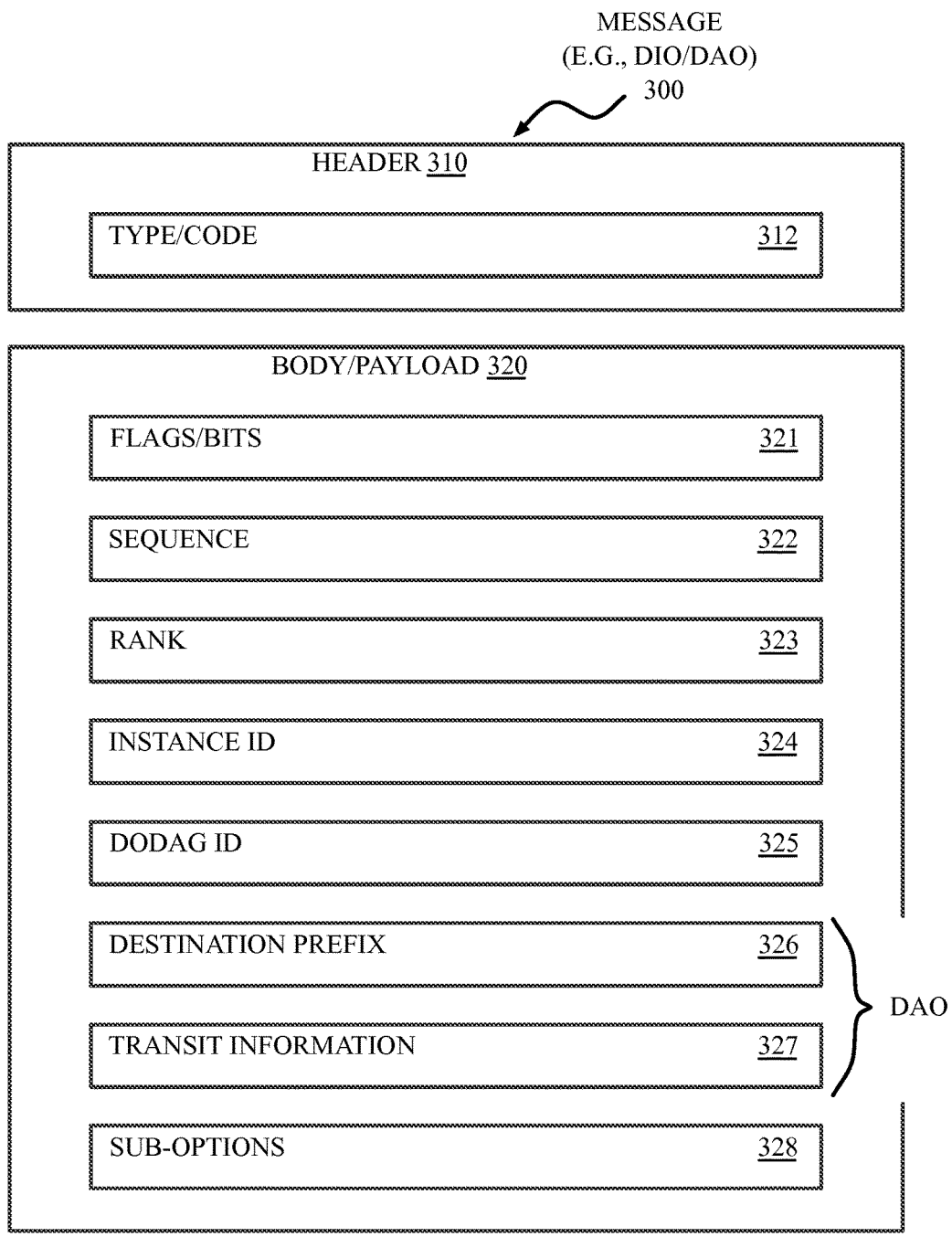
FIG. 3 is a block diagram depicting packet header and payload organization in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO_Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
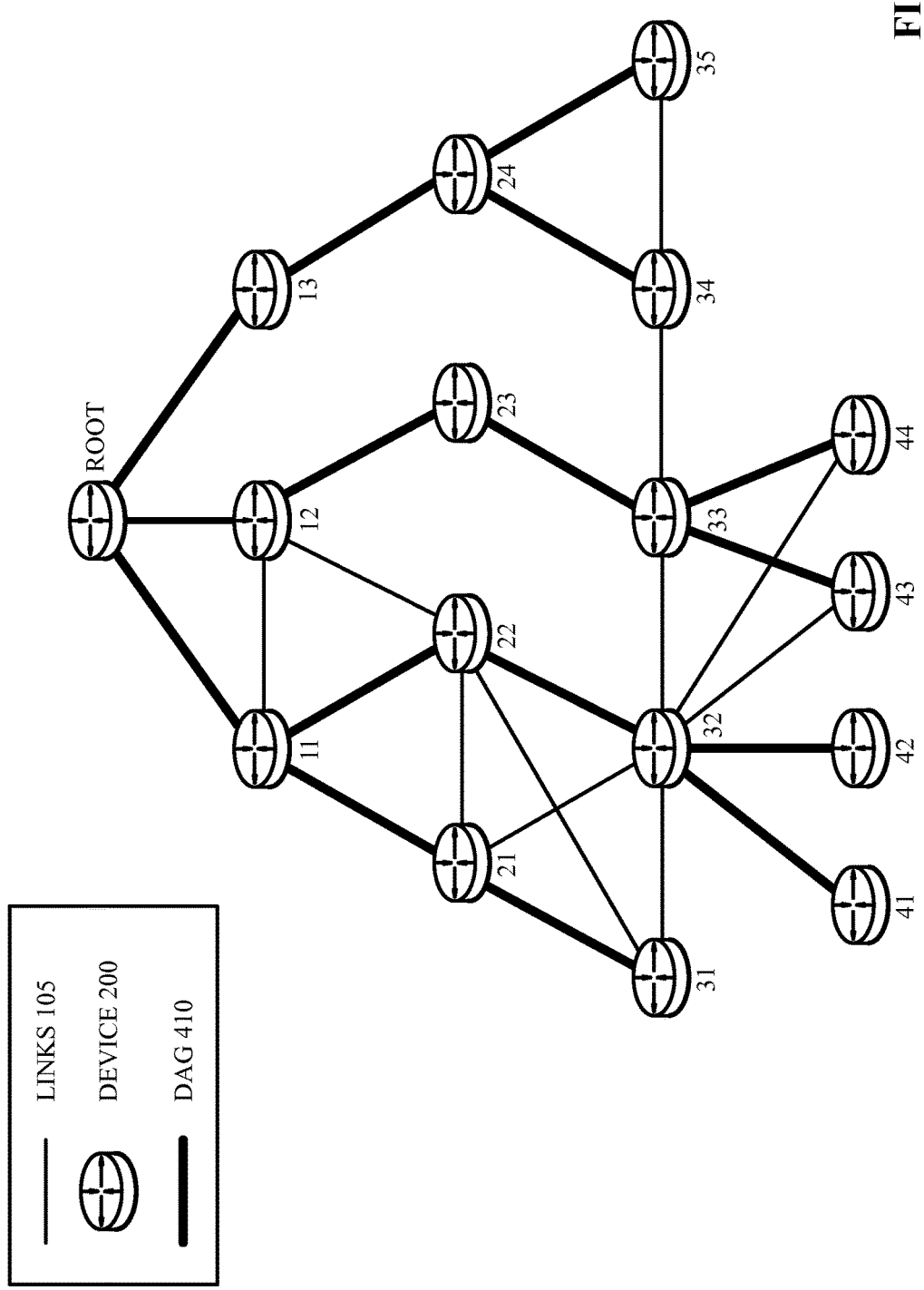
FIG. 4 is a diagram depicting a directed acyclic graph defined within a computer network in accordance with certain example embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC) networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:
1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC). Without proper mechanisms, these situations can cause networks to violate critical service level agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+ round robin+dynamic priorities), (4) bandwidth reservation (for example, Diffserv (by CoS), Intserv (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, (8) Congestion Avoidance techniques, etc. However, while some of these techniques may apply to LLNs, most are not suitable because they are too costly in terms of bandwidth (control plane overhead), memory (state maintenance), and/ or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Utilizing Multiple Interfaces when Sending Data and Acknowledgement Packets

Smart Grid advance metering infrastructure (AMI) deployments utilize a number of different link technologies, including RF, power line communication (PLC), and cellular. Each link technology provides its own set of strengths and weaknesses. The problem is that a Smart Grid AMI deployment only utilizes a single link technology, then attempts to patch with other link technologies.

An alternative approach is to have Smart Grid AMI devices support multiple link technologies simultaneously (for example, RF and PLC). This approach has been cost-prohibitive since it effectively meant doubling the cost of communications. However, recent advances have broken down the cost barrier, and it is now possible to construct network interfaces that utilize both RF and PLC using a single digital signal processor (DSP) chip and two analog front-ends supporting IEEE 802.15.4 g and IEEEE P1901.2. The DSP performs all baseband processing for both network interfaces. One core may be dedicated to perform the baseband processing for each network interface, allowing the two network interfaces to operate independently and in parallel with each other.

The multiple network interface solution opens the door to addressing numerous technical issues and making a number of technology improvements. Because LLN communication is inherently unreliable, LLN technologies use automatic repeat request (ARQ) techniques to manage communication failures across each link hop. Because LLN links are typically half-duplex, a primary challenge with ARQ methods is that the transmitter or sender must stop its transmission, switch to receive mode, and wait to receive an acknowledgement from the receiver. Interleaving data and acknowledgement messages can represent significant overhead, especially when combined with the small data frame sizes typically used in LLNs. In addition, existing ARQ models typically assume that the link is symmetric and communication can occur in both directions.

According to the techniques described herein, a sender of data can specify what network interface and the transmission parameters the receiver should use when sending an acknowledgement. In an example embodiment, by sending the acknowledgement on a different network interface, the sender does not need to stop and wait when sending data packets. The sender can request to reduce the transmit data rate of the acknowledgement packet based on the transmission time of data packets to improve overall reliability without affecting effective throughput. In another example embodiment, by coordinating network interfaces used for sending and receiving packets, a device can receive and send data streams simultaneously.

A first embodiment comprises the sender device specifying how the receiver device should transmit the acknowledgement message. In an example embodiment, when requesting an acknowledgement, the sender includes additional acknowledgement transmission information with the data packet itself. For example, when using IEEE 802.15.4e-2012, the acknowledgement transmission parameters may be encoded in an Information Element. In another example embodiment, the sender may provide the acknowledgement transmission information in a separate message exchange. The acknowledgement transmission information comprises instructions for which network interface to transmit the acknowledgement. In this embodiment, the receiver then applies the information to all subsequent acknowledgements transmitted to the sender.

A second embodiment comprises dynamically selecting the acknowledgement transmission parameters based on link characteristic information. In an example embodiment, one or more network interfaces may provide good bidirectional connectivity and the sender may request that the receiver transmit the acknowledgement on the same network interface as the data packet itself.

In another example embodiment, one network interface may provide good connectivity in one direction and another network interface may provide good connectivity in the reverse direction. In this embodiment, the sender may request the receiver to transmit the acknowledgement on a different network interface than the one used for data transmission.

In yet another example embodiment, the sender may choose to begin sending the next data packet without first receiving an acknowledgement packet. Because the sender requested that the receiver transmit the acknowledgement on a different network interface, the data and the acknowledgement transmissions will not interfere.

In another example embodiment, a sender may utilize a hybrid approach that involves both stopping and waiting to receive the acknowledgement as well as continuous transmission. For example, one or more network interfaces may provide good connectivity in one direction, but a different subset of network interfaces may provide good connectivity in the other direction. In this example, the sender may choose to utilize the non-overlapping set of network interfaces to communicate data packets without waiting for the acknowledgements. On the overlapping set of network interfaces, the sender may wait to receive the acknowledgement between each data packet. As a result, the sender can better utilize the link to the receiver.

Connectivity may be described as "effective throughput." Because acknowledgement packets are smaller than data packets, a network interface that provides less effective throughput may be prioritized for sending acknowledgements. Because it is possible to send data and receive acknowledgements simultaneously on different network interfaces, it is also possible to reduce the transmit data rate of acknowledgements it increase overall reliability. For example, the sender may scale the acknowledgement transmission data rate based on the data packet transmission time. As long as the transmission time for the acknowledgement packet is not less than the transmission time for the data packets, effective throughput of the data packets will not decrease.

A third embodiment comprises dynamically selecting the acknowledgement transmission parameters based on the expected utilization of each network interface. For example, a single network interface may be dedicated to a sender-receiver pair at a given point in time. A different network interface may be dedicated to a different sender-receiver pair at the same point in time. As a result, it becomes possible for the two sender-receiver pairs to communicate simultaneously on the different network interfaces. In an example embodiment, the sender-receiver pairs do not need to be completely disjoint. For example, in an A to B to C communication, the communication from A to B can occur at the same time as the communication from B to C since they occur on different network interfaces. In an example embodiment, the sender may dynamically select which network interface to transmit the acknowledgement on based on the expected utilization and/or allocation for each network interface.

Figure 5:
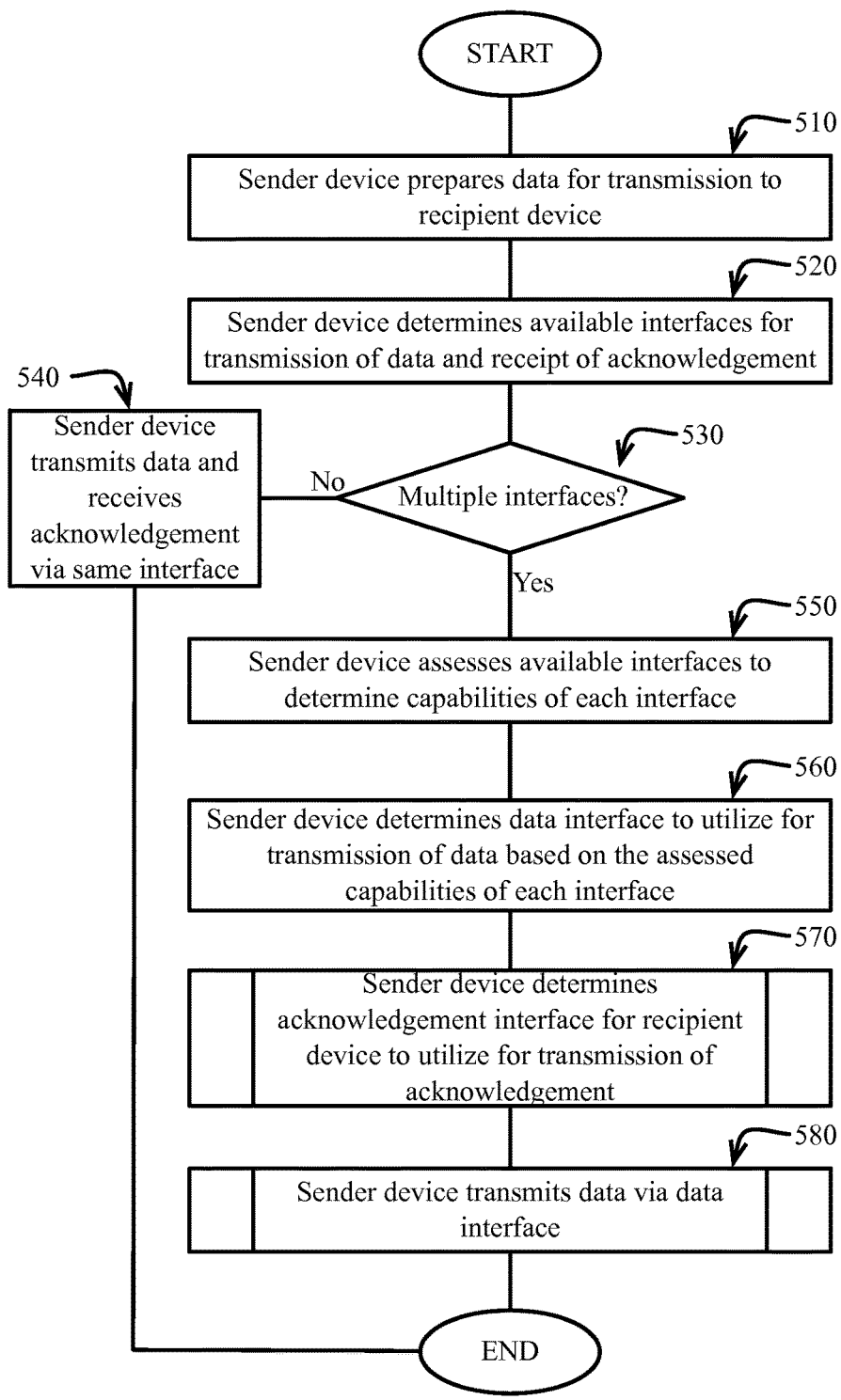
FIG. 5 is a block flow diagram depicting a method for utilizing multiple interfaces when sending data and acknowledgement packets in accordance with certain example embodiments.

FIG. 5 is a block flow diagram depicting a method 500 for utilizing multiple interfaces when sending data and acknowledgement packets in accordance with certain example embodiments. The method 500 is described with reference to the components illustrated in FIGS. 1-4.

In an example embodiment, the device 200 is a sender device/node 200a that transmits one or more data packets to one or more recipient devices/nodes 200b over one or more network interfaces 210. In this embodiment, the network interface 210 used to transmit the data packet to the recipient device 200b is a data interface 210a. In an example embodiment, the recipient device/node 200b transmits one or more acknowledgement packets to the one or more sender devices/nodes 200a over one or more network interfaces 210. In this embodiment, the network interface 210 used to transmit the acknowledgement packet to the sender device 200a is an acknowledgement interface 210b.

In block 510, the sender device 200a prepares data for transmission to the recipient device 200b. In an example embodiment, the data comprises a data packet or data formatted for transmission over the network interface 210. In an alternative example embodiment, the data comprises a series of bytes or characters. In an example embodiment, the sender device 200a prepares the data for transmission to the recipient device 200b by formatting the data into packets. In an alternative example embodiment, the data is prepared by one or more other network devices 200 and transmitted to the sender device 200a.

In block 520, the sender device 200a determines the available network interfaces 210 for transmission of the data packet and receipt of the acknowledgement packet. In an example embodiment, the sender device 200a determines which network interfaces 210 are available to the sender device 200a. The sender device 200a also may determine which network interfaces 210 are available to the recipient device 200b. In example embodiments, the sender device 200a may execute a process to examine available network interfaces 210. For example, the network interfaces 210 or other component of the devices 200 may monitor and log performance of available network interfaces and indicate whether a particular network interface 210 is available for communication based on one or more of the particular network interface 210 being operational and meeting minimum specified communication quality requirements. Additionally, the recipient devices 210b may communicate reports to the sender device 210 that indicate available network interfaces for the recipient devices 210b. Alternatively, the sender device 210a may determine available network interfaces 210 for recipient devices 210b based on network interfaces via which messages are received from the recipient devices 210b.

In block 530, the sender device 200a determines whether multiple network interfaces 210 are available to the sender device 200a and the recipient device 200b. If multiple network interfaces 210 are not available, the method 500 proceeds to block 540.

In block 540, the sender device 200a transmits the data packet to the recipient device 200b and receives the acknowledgement packet from the recipient device 200b over the same network interface 210. In an example embodiment, the data interface 210a and the acknowledgement interface 210b are the same network interface 210. In this embodiment, the sender device 200a transmits the data packet to the recipient device 200b over the network interface 210. The recipient device 200b receives the data packet and transmits the acknowledgement packet to the sender device 200a over the same network interface 210.

Returning to block 530, if multiple network interfaces 210 are available to the sender device 200a and the recipient device 200b, the method 500 proceeds to block 550.

In block 550, the sender device 200a assesses the available network interfaces 210 to determine capabilities of each interface 210. The sender device 200a determines the ability of the each network interface 210 to send and receive data. In an example embodiment, the sender device 200a assesses the available network interfaces 210 to determine which interface 210 will function as the data interface 210a. In an example embodiment, the sender device 200a also assesses the available network interfaces 210 to determine which interface 210 will function as the acknowledgement interface 210b. In an alternative example embodiment, the sender device 200a assesses the available network interfaces 210 to provide parameters to the recipient device 200b that will assist the device 200b in determining which interface 210 will function as the acknowledgement interface 210b. In yet another alternative example embodiment, one or more other network devices 200 determines the capabilities of each interface and/or which interface will function as the data interface 210a and the acknowledgement interface 210b.

In an example embodiment, the sender device 200a determines the nominal data rates or bit rates of each interface 210. In an alternative example embodiment, the sender device 200a determines the data rate of each interface 210 at the time of transmission, as the actual data rates may vary based on external factors. For example, the external factors may include temporal changes in interference (for example, other wireless networks or electrical appliances), physical obstruction (for example, doors opening/closing or seasonal changes in foliage density of trees), and propagation characteristics of the physical media (for example, temperature or humidity changes). The sender device 200a may determine if other network devices 200 are attempting to utilize the hardware or software infrastructure of the network interface 210.

In an example embodiment, the sender device 200a assesses the time that will be required for the transmission of the data and/or the acknowledgement for each network interface 210. The time that will be required is dependent on the size of the data packet to be transmitted, the size of the acknowledgement message, the assessed data flow rates, and other suitable factors.

In an example embodiment, the data rates, the transmission sizes, the required times, and other suitable factors affecting the transfer may be incorporated in a tone map or other assessment of the transmission options. For example, the tone map may indicate that, for the most efficient transfer, the data package should be transmitted on the data interface 210a at a first particular rate and the acknowledgement should be transmitted on the acknowledgment interface 210b at a second particular rate.

In block 560, the sender device 200a determines which network interface 210 to utilize for transmission of the data based on the assessed capabilities of each interface. In an example embodiment, the network interface 210 utilized for transmission of the data is the data interface 210a.

In an example embodiment, the sender device 200a reviews the data rates of each interface 210 assessed in block 550. In this embodiment, the sender device 200a determines which network interface 210 has the higher data rate and utilizes that network interface 210 as the data interface 210a. For example, data packets are typically larger than acknowledgement packets. In this embodiment, the network interface 210 with the higher data rate is utilized for the transmission of the larger data packets to enable a faster transmission.

In another example embodiment, the sender device 200a reviews the time required for the transmission of the data assessed for each network interface 210. In this embodiment, the sender device 200a determines which network interface 210 will transmit the data the fastest. For example, the sender device 200a can determine the approximate size of the data prepared for transmission in block 510. Depending on the size of the data and the data rate for each network interface 210, the time required for transmission of the data can be determined.

In an alternative example embodiment, the sender device 200a reviews the tone map or otherwise determines which network interface 210 will provide the most efficient data transfer. For example, the sender device 200a will utilize the network interface 210 determined to provide the most efficient transfer of the data package when transmitted at a particular rate.

In block 570, the sender device 200a determines which network interface 210 will be utilized for transmission of the acknowledgement based on the assessed capabilities of each interface. The method 570 is described in more detail hereinafter with reference to the methods described in FIG. 6. In an example embodiment, the network interface 210 utilized for transmission of the acknowledgement is the acknowledgement interface 210b. In an alternative example embodiment, the sender device 200a provides additional parameters based on the assessment of the capabilities of each of the network interfaces 210 to enable the recipient device 210b and/or another network device 200 to determine which network interface 210 will be utilized for transmission of the acknowledgement. In yet another alternative example embodiment, another network device 200 provides instructions and/or additional parameters to the sender device 200a to aid in the determination of which network interface 210 will be utilized for transmission of the acknowledgement.

Figure 6:
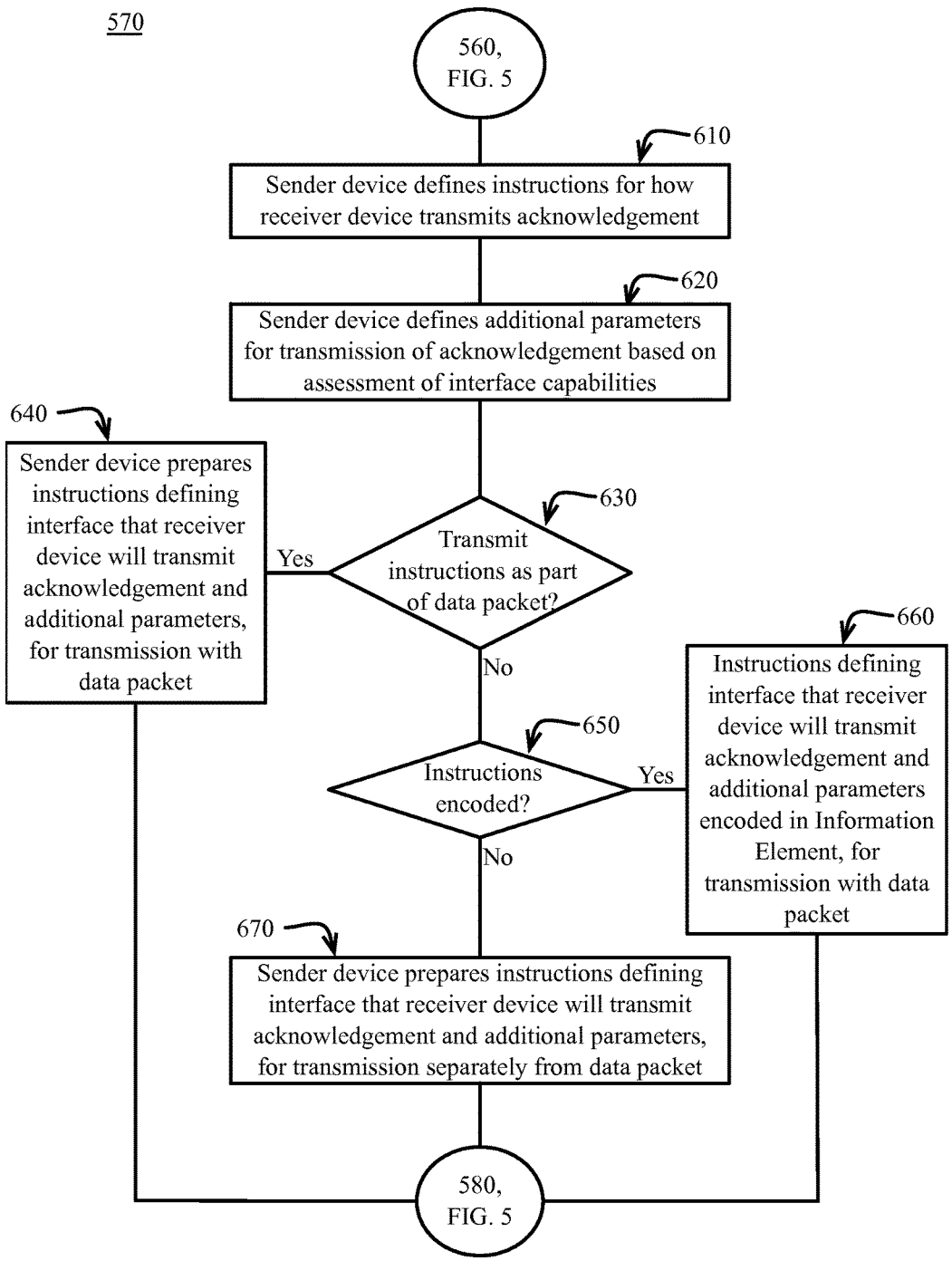
FIG. 6 is a block flow diagram depicting a method for determining an interface to utilize for transmission of an acknowledgement packet in accordance with certain to example embodiments.

FIG. 6 is a block flow diagram depicting a method 570 for determining a network interface 210 to utilize for transmission of the acknowledgement, in accordance with certain example embodiments, as referenced in block 570 of FIG. 5. The method 570 is described with reference to the components illustrated in FIGS. 1-4.

In block 610, the sender device 200a defines instructions for how the receiver device 200b is to transmit an acknowledgement. After the selection is made for which network interface 210 to use to transmit the data, a second network interface 210 is identified as the interface 210 for the recipient device 200b to use for the acknowledgement transmission. That is, if the first network interface 210a is utilized for the data transmission, then the method 570 determines if the second network interface 210b is available and capable of being utilized for the acknowledgement transmission.

The defined instructions may be a request to use the network interface 210b for the acknowledgement transmission if the interface 210b is available. In certain embodiments, the defined instructions are a requirement to use the network interface 210b for the acknowledgement transmission. In another embodiment, the defined instructions are a set of guidelines for selecting the network interface 210b for the acknowledgement transmission.

In block 620, the sender device 200a defines additional parameters for transmission of the acknowledgement based on the assessment of the capabilities of the network interface 210, as described in block 520 of FIG. 5. The parameters that are defined for transmission to the recipient device 200b may include the transmission data rates of the network interfaces 210 and the connecting hardware and software, the modulation of the signals, a tone map of the various interfaces, and any other suitable interface parameters.

The defined parameters are sufficient to allow the recipient device 200b to select an appropriate data transmission rate. In an example embodiment, the time required for the data packet to be transmitted by the network interface 210a to the recipient device 200b is transmitted. The parameters may thus define the time available to the recipient device 200b to transmit the acknowledgement to the sender device 200a. With the time available for transmission, the recipient device 200b will be capable of determining the best data transmission flow rate to ensure the most accurate transmission that will still be delivered in the available time. A slower transmission rate may deliver the acknowledgement more reliably. If the transmission is completed before the data packet transmission is completed, then the effective throughput of the data is not adversely affected.

In block 630, the sender device 210a determines if the transmission instructions are to be included as part of the data in the data packet. In certain embodiments, the transmission instructions are included in the data and may be read by the recipient device 210b when the data packet is delivered. If the transmission instructions are part of the data in the data packet, then the method 570 proceeds to block 640.

In block 640, the sender device 200a prepares instructions defining the network interface 210b that the receiver device 200b will utilize to transmit the acknowledgement and the additional parameters for transmission with the data packet. The instructions are embedded in the data in any suitable manner. For example, the data packet may have a location in the data for the instructions. The instructions may be appended to the end of the data packet. Any suitable manner of embedding the instructions in the data may be utilized.

From block 640, the method 570 returns to block 580 in FIG. 5.

Returning to block 630, if the transmission instructions are not to be part of the data in the data packet, then the method 570 proceeds to block 650.

In block 650, the sender device 200a determines if the instructions are to be encoded for inclusion in an Information Element. For example, if an IEEE standard for local and metropolitan area networks is used, the instructions may be encoded in the management frame or Information Element. For example, the encoded instructions are piggybacked onto the data, instead of encoded as a part of the data in the data packet.

If the instructions are encoded for inclusion in the data as an Information Element, then the method 570 proceeds to block 660. In block 660, the sender device 200a prepares as an Information Element instructions defining the network interface 210b that the receiver device 200b will utilize to transmit the acknowledgement and the additional parameters. The Information Element may be prepared for transmission with the data packet.

From block 660, the method 570 returns to block 580 in FIG. 5.

Returning to block 650, if the instructions are not to be encoded for inclusion in the data as an Information Element, the method 570 proceeds to block 670. In block 670, the sender device 200a prepares instructions defining the network interface 210b that the receiver device 200b will utilize to transmit the acknowledgement and the additional parameters for transmission separately from the data packet. For example, the sender device 200a prepares the instructions and the additional parameters for transmission before, after, or during the data transmission. The instructions and the additional parameters may be prepared for transmission via the same network interface 210a, a different network interface 210b, or any suitable transmission method.

From block 670, the method 570 returns to block 580 in FIG. 5.

Returning to FIG. 5, in block 580, the sender device 200a transmits the data via the data interface 210a. The method for transmitting the data is described in more detail hereinafter with reference to the methods described in FIG. 7.

Figure 7:
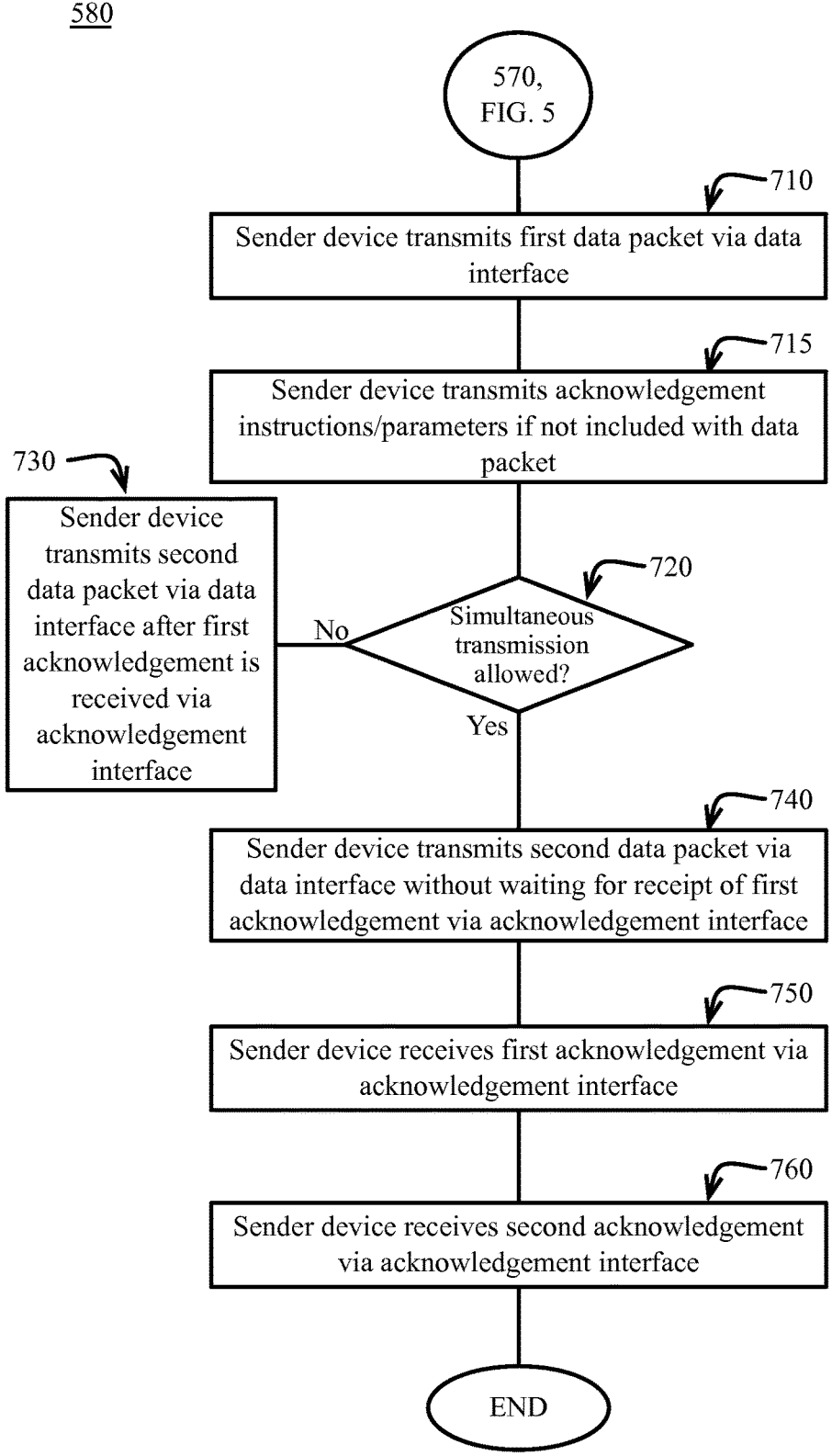
FIG. 7 is a block flow diagram depicting a method for transmitting a data packet in accordance with certain example embodiments.

FIG. 7 is a block flow diagram depicting a method 580 for transmitting a data packet, in accordance with certain example embodiments, as referenced in block 580 of FIG. 5. The method 580 is described with reference to the components illustrated in FIGS. 1-4.

In block 710, the sender device 200a transmits a first data packet via data interface 210a. In an example embodiment, the data interface 210a is determined as described in block 560 of FIG. 5. The data is transmitted via the data interface 210a via any suitable transmission technology as described herein. The data is transmitted to the recipient device 200b and received by the interface 210a of the recipient device 200b. In an example embodiment, the data may be transmitted at any data rate determined by the sender device 200a or any suitable party.

In an example embodiment, the data transmitted may include the additional parameters as described in FIG. 6. The additional parameters may be embedded in the data packet or included as an Information Element.

In block 715, the sender device 200a transmits the acknowledgement instructions and additional parameters, if not included with the data packet. In an example embodiment, if the acknowledgement instructions and additional parameters are defined as described in block 670 of FIG. 6 and not transmitted with the data packet, then a separate transmission is utilized. The separate transmission may be sent before, during, or after the data transmission.

In block 720, the sender device 200a determines if simultaneous transmission of the data and the acknowledgement is allowed. In an example embodiment, the software, hardware, or other system parameters of the sender device 200a or the recipient device 200b may mandate that the transmissions may be sequential and not simultaneous. A user or system administrator may dictate that the transmissions may not be simultaneous. Any suitable component of the network may dictate requirements that force the transmission to be sequential. In an example, a data packet may comprise data whose security protocol requires the acknowledgement to be transmitted on the same interface as the data packet. Thus, a sequential acknowledgement is required and simultaneous transmission of the acknowledgement is not allowed.

If simultaneous transmission of the data and the acknowledgement is not allowed, the method 580 proceeds to block 730. In block 730, the sender device 200a transmits a second data packet via data interface 210a after a first acknowledgement is received via the acknowledgement interface 210b. That is, the sender device 200a waits for the acknowledgement of the first data packet or data stream to be received from the recipient device 200b and then transmits a second data package. In an example embodiment, the decision to wait for the acknowledgement to be received from the recipient device 200b before transmitting a second data package may be determined by the sender device 200a, the recipient device 200b, a user, a system administrator, or any suitable person, software, or hardware element.

Returning to block 720, if simultaneous transmission of the data and the acknowledgement is allowed, the method 580 proceeds to block 740.

In block 740 the sender device 200a transmits a second data packet or package via the data interface 210a without waiting for receipt of the first acknowledgement via the acknowledgement interface 210b. That is, the sender device 200a does not wait for the acknowledgement to be received from the recipient device 200b before transmitting a second data package. The data throughput may be increased by transmitting the data and the acknowledgement simultaneously. In an example embodiment, the sender device 200a may associate the acknowledgement with the appropriate data packet after receipt of the acknowledgement.

In block 750, the sender device receives the first acknowledgement via the acknowledgement interface 210b. In an example embodiment, the acknowledgement may be received at any time after the second data packet is transmitted. For example, the acknowledgement may be received at a time after any subsequent number of data packets are transmitted. In an example embodiment, the sender device 200a may associate the acknowledgement with the appropriate data packet after receipt of the acknowledgement.

In a certain example embodiment, the recipient device 200b determines the speed with which to transmit the acknowledgement. The defined parameters that are transmitted to the recipient device in block 710 or 715 are sufficient to allow the recipient device 200b to select an appropriate data transmission rate and/or the acknowledgement interface 210b. In an example embodiment, the time required for the data packet to be transmitted by the interface 210a to the recipient device 200b is transmitted. The parameters allow the recipient device 200b to determine the time available to transmit the acknowledgement to the sender device 200a. With the time available for transmission, the recipient device 200b determines the best data transmission flow rate and corresponding network interface 210 to ensure the most accurate transmission that will still be delivered in the available time. A slower transmission rate via a certain network interface 210 may deliver the acknowledgement more reliably. If the transmission is completed before the data packet transmission is completed, then the effective throughput of the data is not adversely affected.

In block 760, the sender device 200a receives the second acknowledgement via the acknowledgement interface 210b. In an example embodiment, the acknowledgement may be received at any time after the second data packet is transmitted. In an alternative example embodiment, the acknowledgement may be received at any time after any subsequent number of data packets are transmitted.

Figure 8:
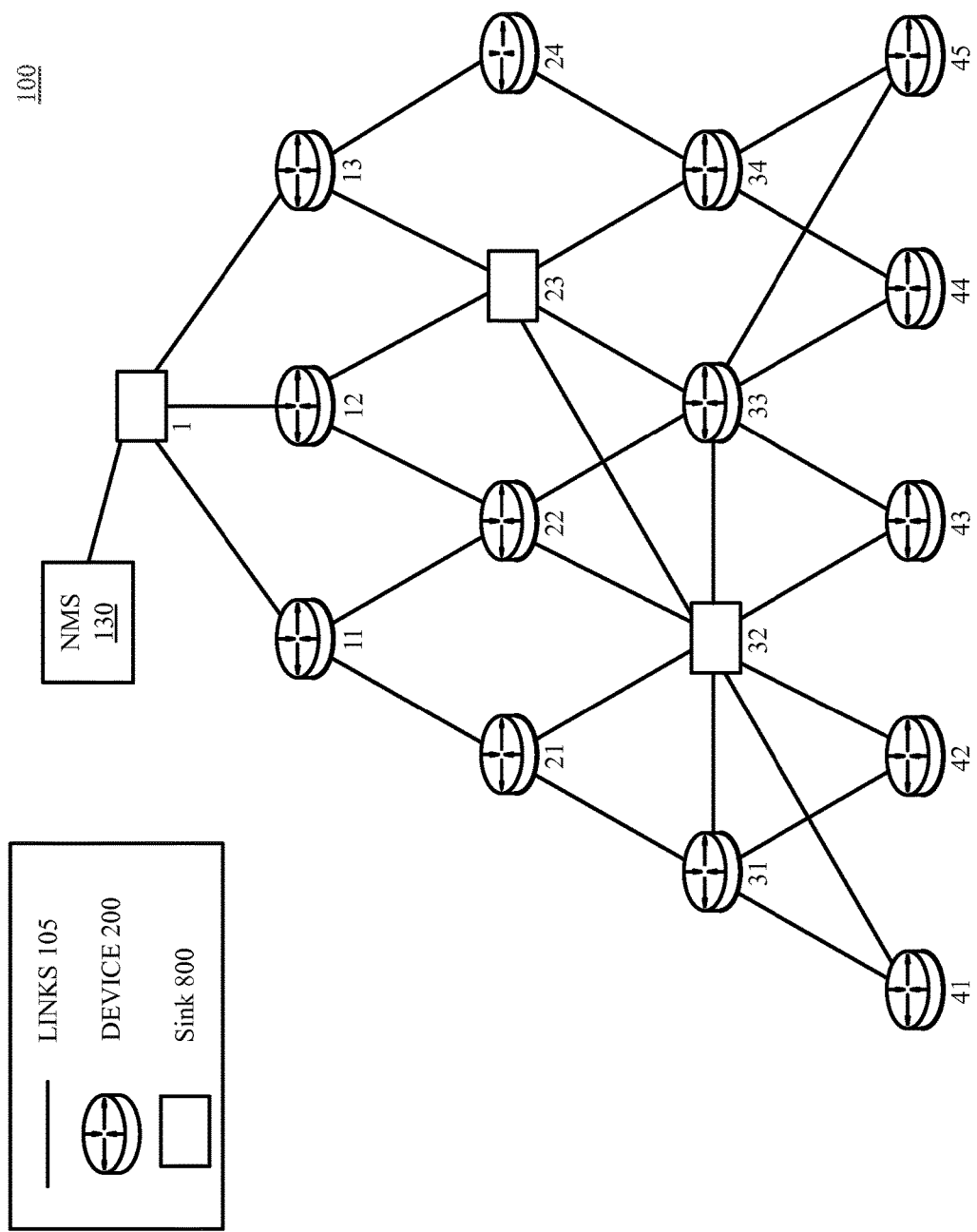
FIG. 8 is a block diagram depicting an example communication network in accordance with certain alternative example embodiments.

Although the above-described techniques have been illustrated with respect to an LLN in which network traffic transits through the root/LBR, it should be noted that the techniques described herein may be generally applied to any network, particularly to any constrained network. For example, as shown in FIG. 8, a network 100 that does not have a central node through which all traffic is piped (for example, like the LBR of an LLN), may have one or more sinks 800 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

The techniques described herein may be performed by hardware, software, and/or firmware, such as in accordance with the "QoS monitoring" process 248/248a shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to utilize multiple interfaces when sending data and acknowledgement messages to facilitate transmission times for delivering data packets, comprising:
    determining, by a sender computing device in a multi-interface, low power and lossy network (LLN), a data transmission rate of each of two or more network interfaces of the sender computing device to transmit data messages to a receiver computing device and to receive acknowledgement messages from the receiver computing device;
    in response to determining the data transmission rate of each of the two or more network interfaces of the sender computing device to transmit data messages to the receiver computing device and to receive acknowledgement messages from the receiver computing device, determining, by the sender computing device, a first network interface to use to transmit data messages to the receiver computing device and a second network interface to use to receive acknowledgment messages from the receiver computing device, the first and second network interfaces being selected based on the data transmission rate of each of the two or more network interfaces of the sender computing device;
    communicating, by the sender computing device, a data message via the first network interface to the receiver computing device, the data message comprising instructions to the receiver computing device instructing the receiver computing device to use the second network interface to communicate acknowledgement messages to the sender computing device; and
    receiving, by the sender computing device and via the second network interface, an acknowledgement message from the receiver device acknowledging receipt of the data message.

2. The computer-implemented method of claim 1, further comprising identifying the two or more network interfaces available for transmission of data messages and receipt of acknowledgement messages.

3. The computer-implemented method of claim 1, further comprising transmitting a second data message by the sender computing device to the receiver computing device via the first network interface simultaneously with receiving the acknowledgement message from the receiver computing device via the second network interface.

4. The computer-implemented method of claim 1, wherein a first network interface is selected based on a determination that the data transmission rate of the first network interface is faster than a second network interface.

5. The computer-implemented method of claim 1, further comprising transmitting a second data message by the sender computing device to the receiver computing device via the first network interface prior to receiving the acknowledgement message from the receiver computing device via the second network interface.

6. An apparatus, comprising:
    one or more network interfaces to communicate with a low power and lossy network (LLN);
    a processor coupled to the network interfaces and adapted to execute one or more processes; and
    a memory configured to store a process executable by the processor, the process when executed operable to:
        identify two common network interfaces of a sender device and a receiver device that are available for transmission of a data message from the sender device to the receiver device and an acknowledgement message from the receiver device to the sender device;
determine a data transmission rate of each of the two common network interfaces to transmit the data message and the acknowledgement message between the sender device and the receiver device;
in response to determining the data transmission rate of each of the two common network interfaces to transmit the data message and the acknowledgement message between the sender device and the receiver device, specify by the sender device transmission parameters for the receiver device to use when transmitting the acknowledgement message, wherein the transmission parameters assist the receiver device in determining which of the two network interfaces to use when transmitting the acknowledgement message;
transmit, by the sender device, a first communication comprising the transmission parameters for the receiver device to use when transmitting the acknowledgement message;
transmit, by the sender device, a second communication comprising the data message; and
receive the acknowledgement message transmitted by the receiver device, wherein the receiver device used the transmission parameters to determine which of the two common network interfaces to use when transmitting the acknowledgement message.

7. The apparatus as in claim 6, wherein the network interface used for transmitting the data message from the sender device to the receiver device is different than the network interface used for transmitting the acknowledgement message from the receiver device to the sender device.

8. The apparatus as in claim 6, wherein the process when executed is further operable to transmit a second data message from the sender device to the receiver device, wherein the second data message is transmitted prior to receiving the acknowledgement message by the sender device from the receiver device.

9. The apparatus as in claim 6, wherein the process when executed is further operable to transmit a second data message from the sender device to the receiver device, wherein the second data message is transmitted simultaneously with receiving the acknowledgement message by the sender device from the receiver device.

10. The apparatus as in claim 6, wherein the transmission parameters comprise a specification of which network interface of the two network interfaces to use when transmitting the acknowledgement message to the sender device, and wherein the receiver device uses the specified network interface to transmit the acknowledgement message to the sender device.

11. The apparatus as in claim 6, wherein the receiver device determines which network interface of the two network interfaces to use when transmitting the acknowledgement message to the sender device based on the transmission parameters received by the receiver device from the sender device.

12. The apparatus as in claim 6, wherein the transmission parameters comprise one or more of a data rate, modulation, or a tone map of the network interfaces.

13. The apparatus as in claim 6, wherein a first network interface used to transmit the data message to the receiver device is selected based on a determination that the data transmission rate of the first network interface is faster than a second network interface used to receive the acknowledgement message from the receiver device.

14. A tangible, non-transitory, computer-readable media having software encoded thereon, the software when executed by a processor operable to:
identify two or more network interfaces in a multi-interface, low power and lossy network (LLN) available for transmission of a data message and an acknowledgement message;
determine a data transmission rate of each of two or more network interfaces to transmit the data message and the acknowledgement message;
in response to determining the data transmission rate of each of the two or more network interfaces to transmit the data message and the acknowledgement message, specify transmission parameters for a receiver device to use when transmitting the acknowledgement message, wherein the transmission parameters assist the receiver device in determining which of the two or more network interface to use when transmitting the acknowledgement message;
transmit the data message to the receiver device, the data message comprising the transmission parameters for the receiver device to use when transmitting the acknowledgement message; and
receive the acknowledgement message, wherein the receiver device used the transmission parameters to determine which of the two or more network interfaces to use when transmitting the acknowledgement message.

15. The computer-readable media of claim 14, wherein a network interface used for transmitting the data message from the sender device to the receiver device is different than a network interface used for transmitting the acknowledgement message from the receiver device to the sender device.

16. The computer-readable media of claim 14, wherein the process when executed is further operable to transmit a second data message from the sender device to the receiver device, wherein the second data message is transmitted prior to receiving the acknowledgement message by the sender device from the receiver device.

17. The computer-readable media of claim 14, wherein the process when executed is further operable to transmit a second data message from the sender device to the receiver device, wherein the second data message is transmitted simultaneously with receiving the acknowledgement message by the sender device from the receiver device.

18. The computer-readable media of claim 14, wherein the transmission parameters comprise a specification of which network interface of the two network interfaces to use when transmitting the acknowledgement message to the sender device, and wherein the receiver device uses the specified network interface to transmit the acknowledgement message to the sender device.

19. The computer-readable media of claim 14, wherein the receiver device determines which network interface of the two network interfaces to use when transmitting the acknowledgement message to the sender device based on the transmission parameters received by the receiver device from the sender device.

20. The computer-readable media of claim 14, wherein the transmission parameters comprise one or more of a data rate, modulation, or a tone map of the network interfaces.

21. The computer-readable media of claim 14, wherein a first network interface used to transmit the data message to the receiver device is selected based on a determination that the data transmission rate of the first network interface is faster than a second network interface used to receive the acknowledgement message from the receiver device.

* * * * *